US011488092B2

(12) United States Patent
Gittings et al.

(10) Patent No.: US 11,488,092 B2
(45) Date of Patent: *Nov. 1, 2022

(54) SYSTEMS AND METHODS FOR PROVIDING PROACTIVE REGULATORY COMPLIANCE SERVICES FOR PACKAGES POTENTIALLY CONTAINING REGULATED GOODS AND BEING TRANSPORTED IN A PACKAGE DELIVERY NETWORK

(71) Applicant: United Parcel Service of America, Inc., Atlanta, GA (US)

(72) Inventors: Dave Gittings, Roswell, GA (US); Bradley Cook, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,884

(22) Filed: Nov. 6, 2020

(65) Prior Publication Data

US 2021/0056495 A1 Feb. 25, 2021

Related U.S. Application Data

(63) Continuation of application No. 16/028,873, filed on Jul. 6, 2018, now Pat. No. 10,832,202, which is a continuation of application No. 14/219,321, filed on Mar. 19, 2014, now Pat. No. 10,019,692.

(51) Int. Cl.
 *G06Q 10/08* (2012.01)

(52) U.S. Cl.
 CPC ....... *G06Q 10/083* (2013.01); *G06Q 10/0832* (2013.01); *G06Q 10/08355* (2013.01)

(58) Field of Classification Search
 CPC ............ G06Q 10/083; G06Q 10/0832; G06Q 10/08355
 USPC ........................................................ 705/330
 See application file for complete search history.

(56) References Cited

U.S. PATENT DOCUMENTS

| 6,304,856 B1 * | 10/2001 | Soga ...................... G06Q 10/08 705/28 |
|---|---|---|
| 2008/0126157 A1 | 5/2008 | Rousso et al. |
| 2008/0140432 A1 | 6/2008 | Fenn |
| 2008/0172270 A1 | 7/2008 | Eckenroth |
| 2009/0055232 A1 | 2/2009 | Bruno et al. |

(Continued)

*Primary Examiner* — Robert R Niquette
(74) *Attorney, Agent, or Firm* — Shook, Hardy & Bacon L.L.P.

(57) ABSTRACT

Various embodiments provide systems, methods, and computer program products for dynamically monitoring transport of a plurality of packages potentially containing regulated goods so as to ensure compliance with one or more regulations within a plurality of jurisdictions. The embodiments utilize one or more computer processors or one or more executable portions to: receive transport data associated with the transport of at least one of the plurality of packages and regulatory data associated with the at least one jurisdiction in which transport occurs; determine whether the one of the plurality of packages contains at least one regulated good; if the presence of at least one regulated good is determined, validate consignor data and the transport data; whereby in response to an unsuccessful validation, at least one report is generated to prevent or otherwise mitigate transport of the one of the plurality of packages in the at least one identified jurisdiction.

19 Claims, 11 Drawing Sheets

(56) References Cited

U.S. PATENT DOCUMENTS

| | | |
|---|---|---|
| 2012/0158607 A1 | 6/2012 | Burns et al. |
| 2012/0254049 A1 | 10/2012 | Eckenroth |
| 2013/0226822 A1 | 8/2013 | Eckenroth |
| 2013/0246291 A1 | 9/2013 | Dick et al. |
| 2013/0246292 A1 | 9/2013 | Dick et al. |
| 2013/0290200 A1 | 10/2013 | Singhal et al. |
| 2015/0066798 A1* | 3/2015 | Gillen .................. G06Q 10/083 705/336 |
| 2015/0269514 A1* | 9/2015 | Gittings ........... G06Q 10/08355 705/330 |
| 2018/0315005 A1 | 11/2018 | Gittings et al. |

* cited by examiner

SYSTEMS AND METHODS FOR PROVIDING PROACTIVE REGULATORY COMPLIANCE SERVICES FOR PACKAGES POTENTIALLY CONTAINING REGULATED GOODS AND BEING TRANSPORTED IN A PACKAGE DELIVERY NETWORK

CROSS-REFERENCE TO RELATED APPLICATIONS

The present application is a continuation of and claims priority to and the benefit of U.S. application Ser. No. 16/028,873, filed Jul. 6, 2018, which is a continuation of and claims priority to and the benefit of U.S. application Ser. No. 14/219,321, filed Mar. 19, 2014, which are hereby incorporated by reference in its entirety.

BACKGROUND

Field of Invention

Various embodiments of the disclosed invention generally relate to systems and methods for dynamically monitoring transport of a plurality of packages potentially containing regulated goods so as to ensure compliance with one or more regulations within one or more of a plurality of jurisdictions. For example, shipments into and through various states may be monitored so as to determine whether such contain goods or items subject to one or more regulations in the jurisdiction of transport.

Description of Related Art

In the United States and elsewhere, distributors of regulated goods are required to be registered and authorized with one or more entities, such as the non-limiting example of the Alcoholic Beverage Commission (ABC) of one or more states or jurisdictions prior to transporting any regulated goods in or through the states or jurisdictions. Regulated goods encompass a variety of goods, including the non-limiting example of wine shipments.

Conventional license and shipment validation procedures involve a plurality of systems and service providers, each performing discrete and oftentimes separate (and not cross-referenced) tasks so as to ensure the distributors (or the consignors of the shipments) are duly authorized. Oftentimes, shipper or consignor license verification and/or package content verification has occurred haphazardly, even post-delivery of the package or shipment itself. As a result, carriers risk exposure to a certain degree of liability, where, after the fact, unauthorized shipments are identified. Indeed, failure to effectively, efficiently, and timely verify licenses and package contents so as to minimize the occurrence of unauthorized shipments may result in fines and/or a loss of privilege to ship the regulated goods within one or more jurisdictions.

Therefore, a need exists for an improved system and method for dynamically monitoring transport of a plurality of packages potentially containing regulated goods so as to ensure compliance with one or more regulations within one or more of a plurality of jurisdictions. A need also exists to enable effective mitigation actions to halt and/or redirect transport upon identification of unauthorized shipments in a timely fashion.

BRIEF SUMMARY

According to various embodiments of the present invention, a system for dynamically monitoring transport of a plurality of packages potentially containing regulated goods so as to ensure compliance with one or more regulations within one or more of a plurality of jurisdictions is provided. The system comprises: one or more memory storage areas containing consignor data associated with one or more consignors requesting transport of the plurality of packages, the consignor data comprising at least a consignor identification number; and one or more computer processors. The one or more computer processors are configured to: receive transport data associated with the transport of at least one of the plurality of packages, the transport data comprising at least package content data, one or more transport parameters, and an identification of at least one jurisdiction in which transport of the one of the plurality of packages occurs; retrieve regulatory data associated with the at least one jurisdiction in which transport occurs; determine whether the one of the plurality of packages contains at least one regulated good, the determination being based at least in part upon a comparison of at least a portion of the package content data with the regulatory data; if the presence of at least one regulated good is determined, validate the consignor data and the transport data, the validation of the consignor data comprising a comparison of the consignor identification number against one or more approved consignor identification numbers of the at least one jurisdiction, the validation of the transport data comprising a comparison of the one or more transport parameters against the at least a portion of the regulatory data; in response to an unsuccessful validation of the consignor data or the transport data, generate at least one report configured to prevent transport of the one of the plurality of packages in the at least one identified jurisdiction; and in response to a successful validation of the consignor data and the transport data, facilitate continued transport of the one of the plurality of packages.

According to various embodiments of the present invention, a computer-implemented method for dynamically monitoring transport of a plurality of packages potentially containing regulated goods so as to ensure compliance with one or more regulations within one or more of a plurality of jurisdictions is provided. The method comprises the step of receiving and storing within one or more memory storage areas: consignor data associated with one or more consignors requesting transport of the plurality of packages, the consignor data comprising at least a consignor identification number; transport data associated with the transport of at least one of the plurality of packages, the transport data comprising at least package content data, one or more transport parameters, and an identification of at least one jurisdiction in which transport of the one of the plurality of packages occurs; and regulatory data associated with a plurality of jurisdictions in which transport of the plurality of packages may occur. The method further comprises the steps of: determining, via at least one computer processor, whether the one of the plurality of packages contains at least one regulated good, the determination being based at least in part upon a comparison of at least a portion of the package content data with the regulatory data associated with the at least one jurisdiction in which transport occurs; if the presence of at least one regulated good is determined, validating, via the at least one computer processor, the consignor data and the transport data, the validation of the consignor data comprising a comparison of the consignor identification number against one or more approved consignor identification numbers of the at least one jurisdiction, the validation of the transport data comprising a comparison of the one or more transport parameters against the at least a portion of the regulatory data; in response to an unsuccessful validation of the consignor data or the transport data, generating, via the at least one computer processor, at least one report configured to prevent transport of the one of the plurality of packages in the at least one identified jurisdiction; and in response to a successful validation of the consignor data and the transport data, facilitating continued transport of the one of the plurality of packages.

According to various embodiments of the present invention, a non-transitory computer program product comprising at least one computer-readable storage medium having computer-readable program code portions embodied therein is provided. The computer-readable program code portions comprise an executable portion configured for receiving a plurality of data, wherein the data comprises: consignor data associated with one or more consignors requesting transport of the plurality of packages, the consignor data comprising at least a consignor identification number; transport data associated with the transport of at least one of the plurality of packages, the transport data comprising at least package content data, one or more transport parameters, and an identification of at least one jurisdiction in which transport of the one of the plurality of packages occurs; and regulatory data associated with a plurality of jurisdictions in which transport of the plurality of packages may occur. The computer-readable program code portions further comprise: an executable portion configured for determining whether the one of the plurality of packages contains at least one regulated good, the determination being based at least in part upon a comparison of at least a portion of the package content data with the regulatory data associated with the at least one jurisdiction in which transport occurs; an executable portion configured for, if the presence of at least one regulated good is determined, validating the consignor data and the transport data, the validation of the consignor data comprising a comparison of the consignor identification number against one or more approved consignor identification numbers of the at least one jurisdiction, the validation of the transport data comprising a comparison of the one or more transport parameters against the at least a portion of the regulatory data; an executable portion configured for, in response to an unsuccessful validation of the consignor data or the transport data, generating at least one report configured to prevent transport of the one of the plurality of packages in the at least one identified jurisdiction; and an executable portion configured for, in response to a successful validation of the consignor data and the transport data, facilitating continued transport of the one of the plurality of packages.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 2A:
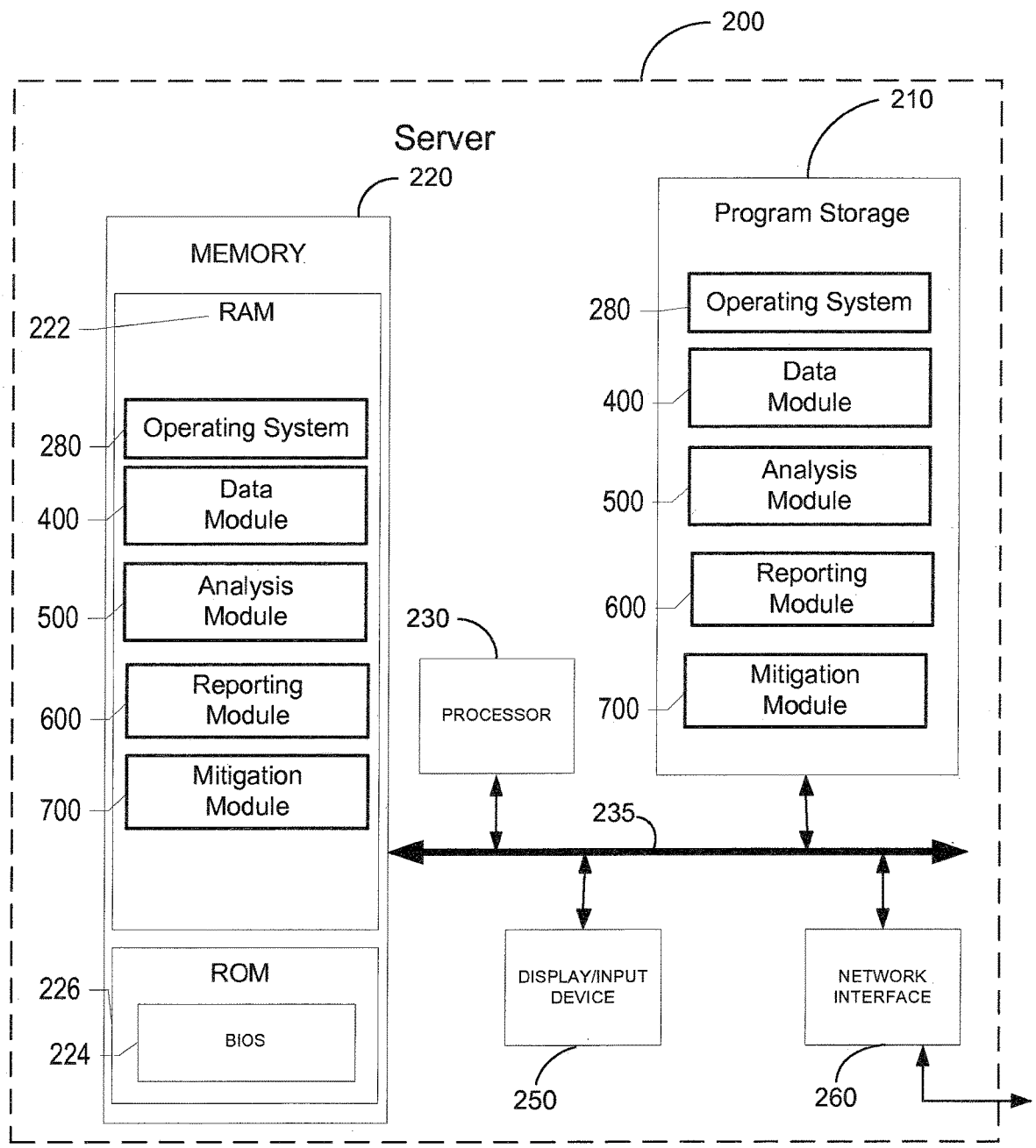
FIG. 2A is schematic block diagram of a server 200 according to various embodiments.
Figure 2B:
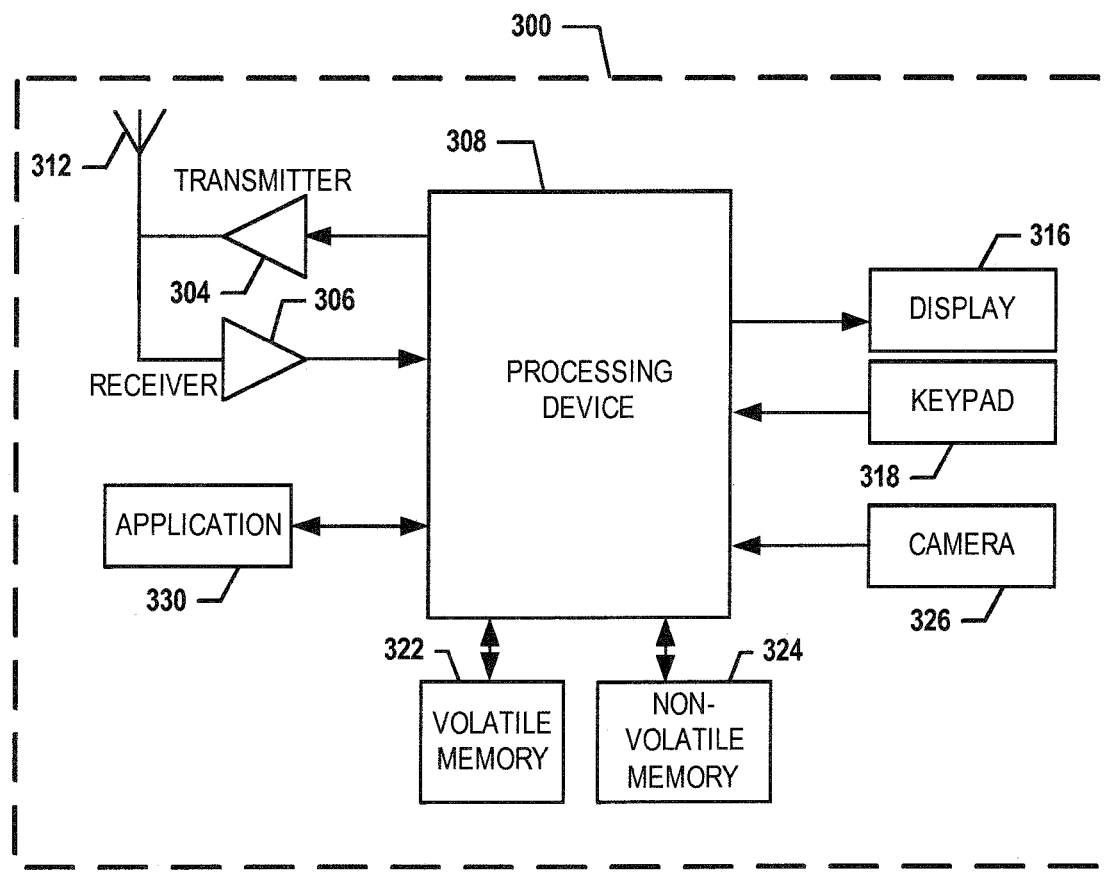
FIG. 2B is schematic block diagram of an exemplary mobile device 300 according to various embodiments.
Figure 3:
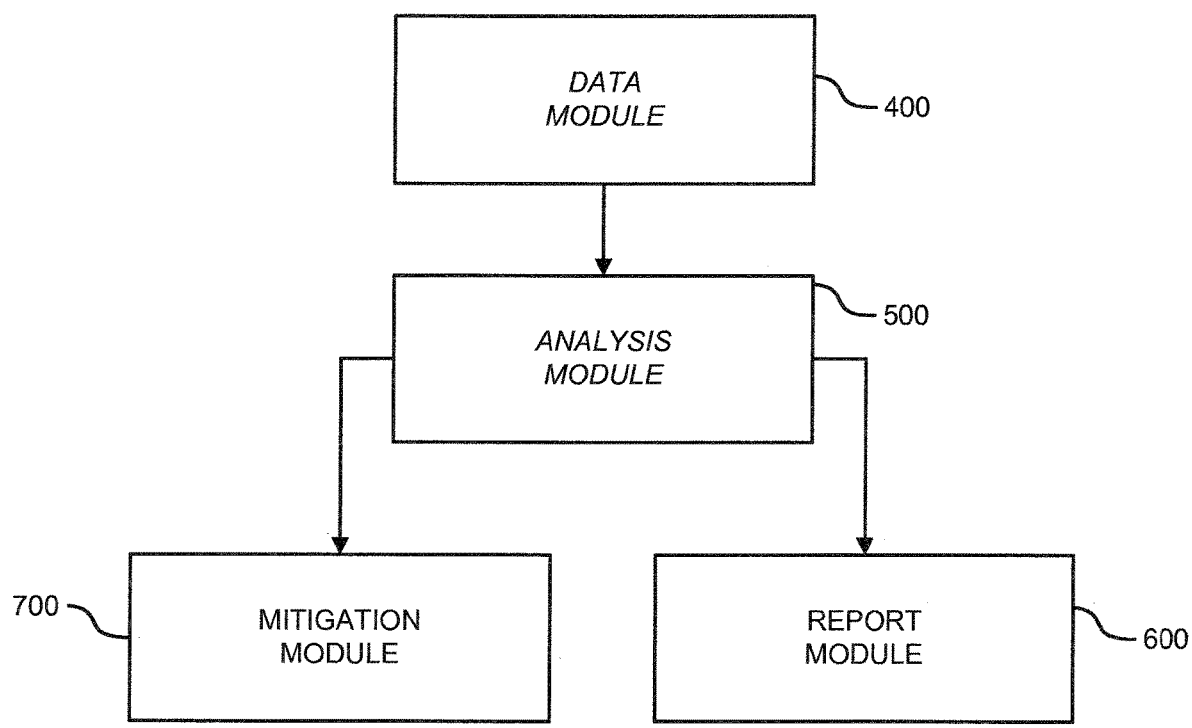
FIG. 3 illustrates an overall process flow for various modules of the server 200 according to various embodiments.
Figure 5:
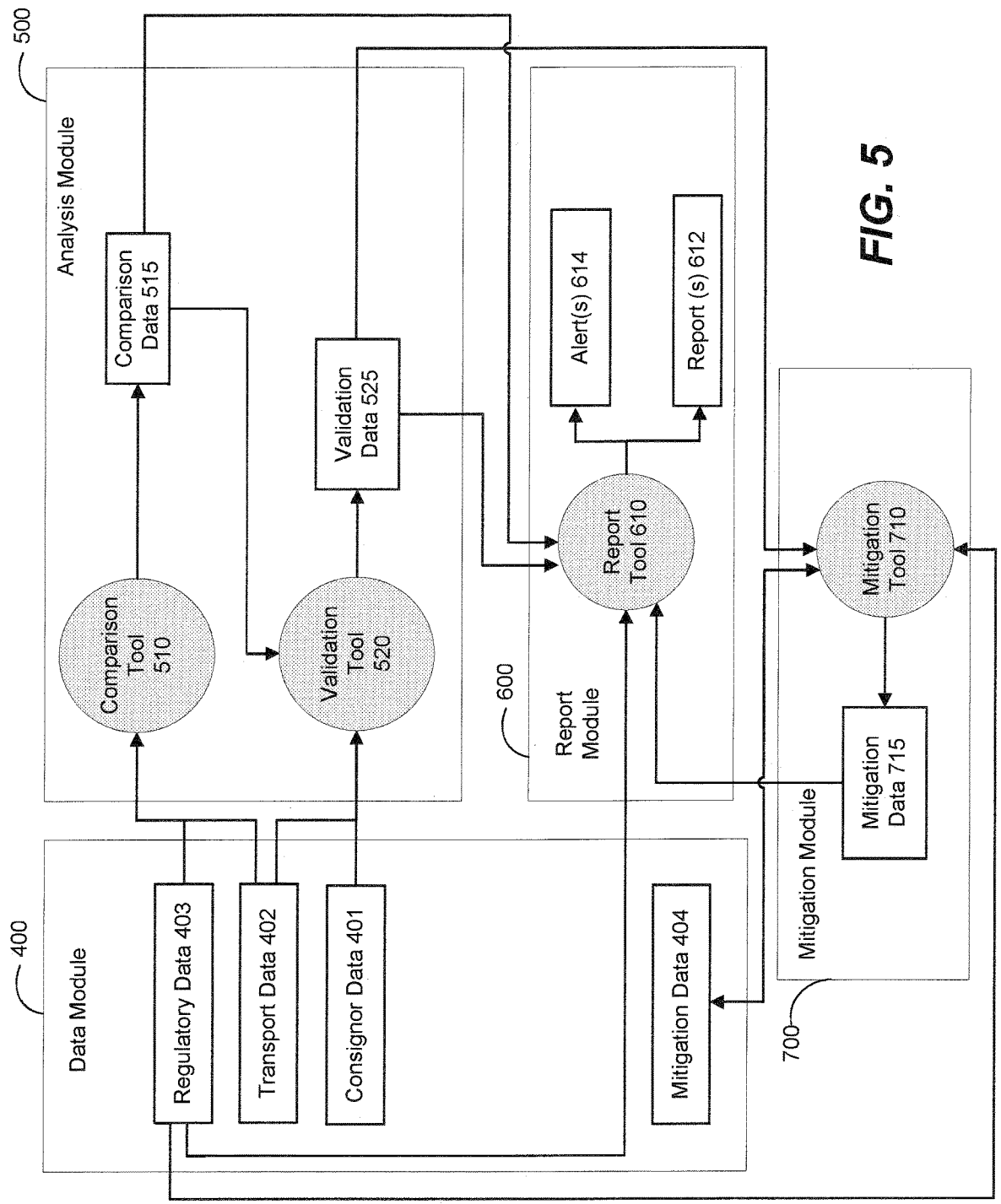
Figure 6:
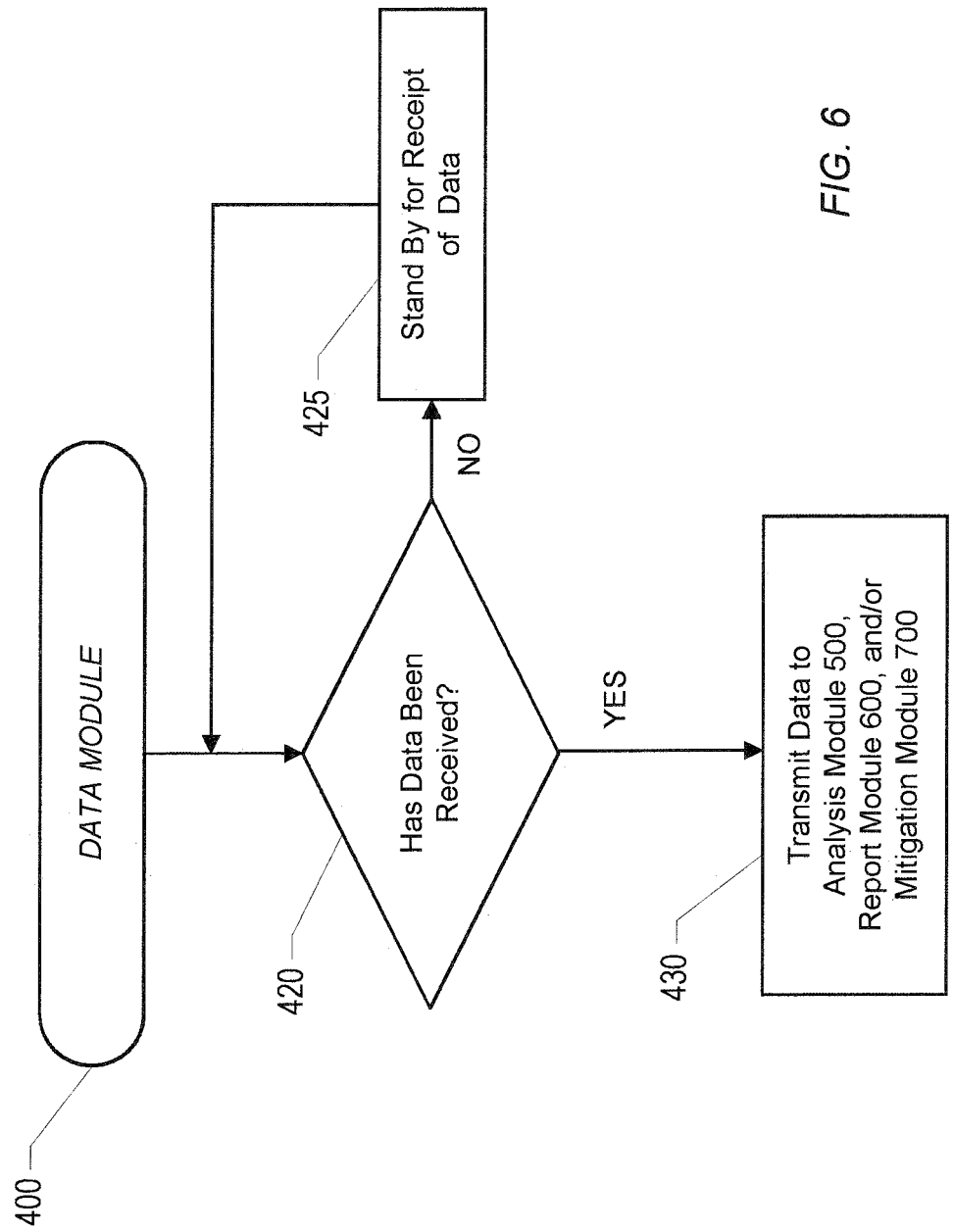
Figure 7:
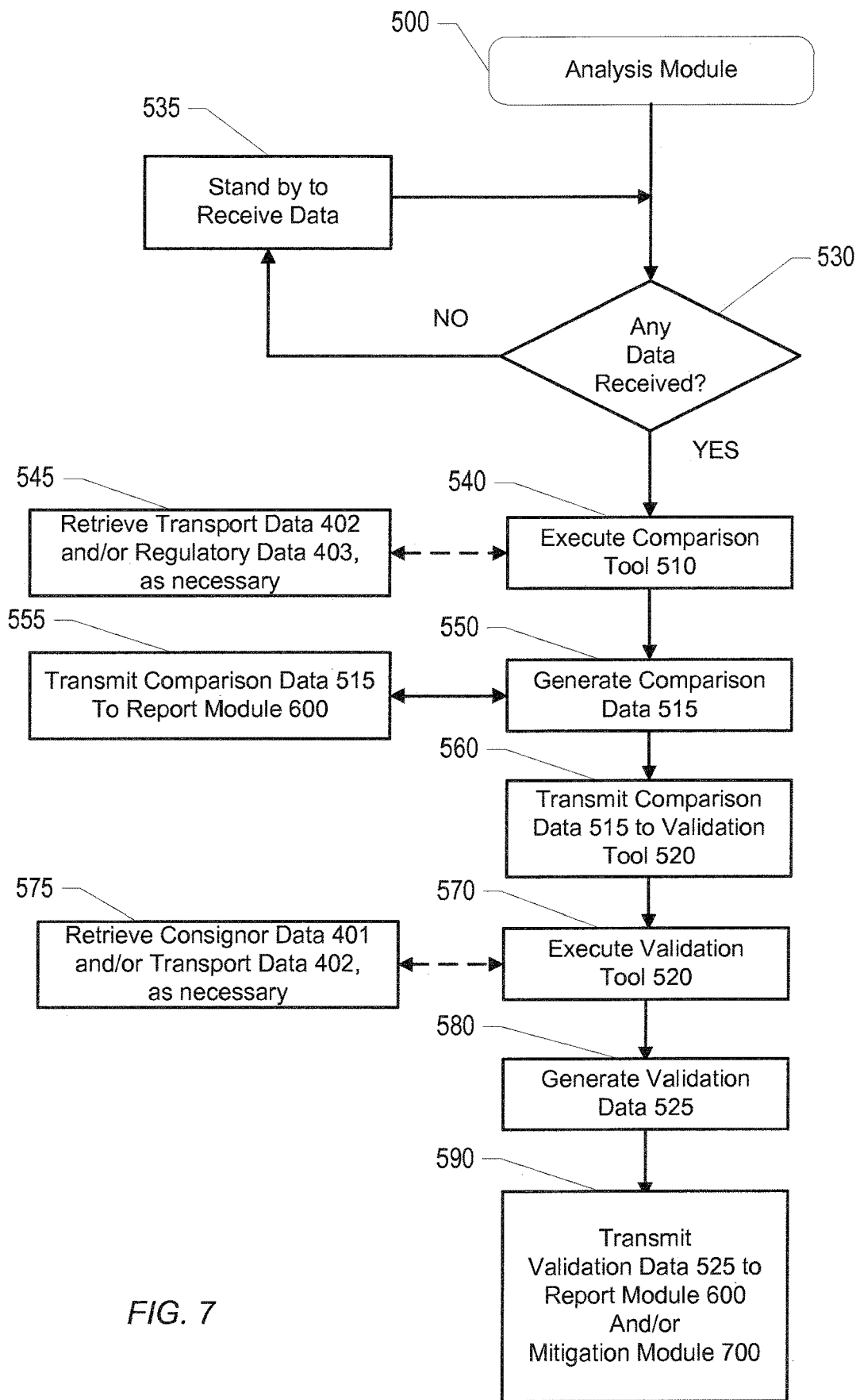
Figure 8:
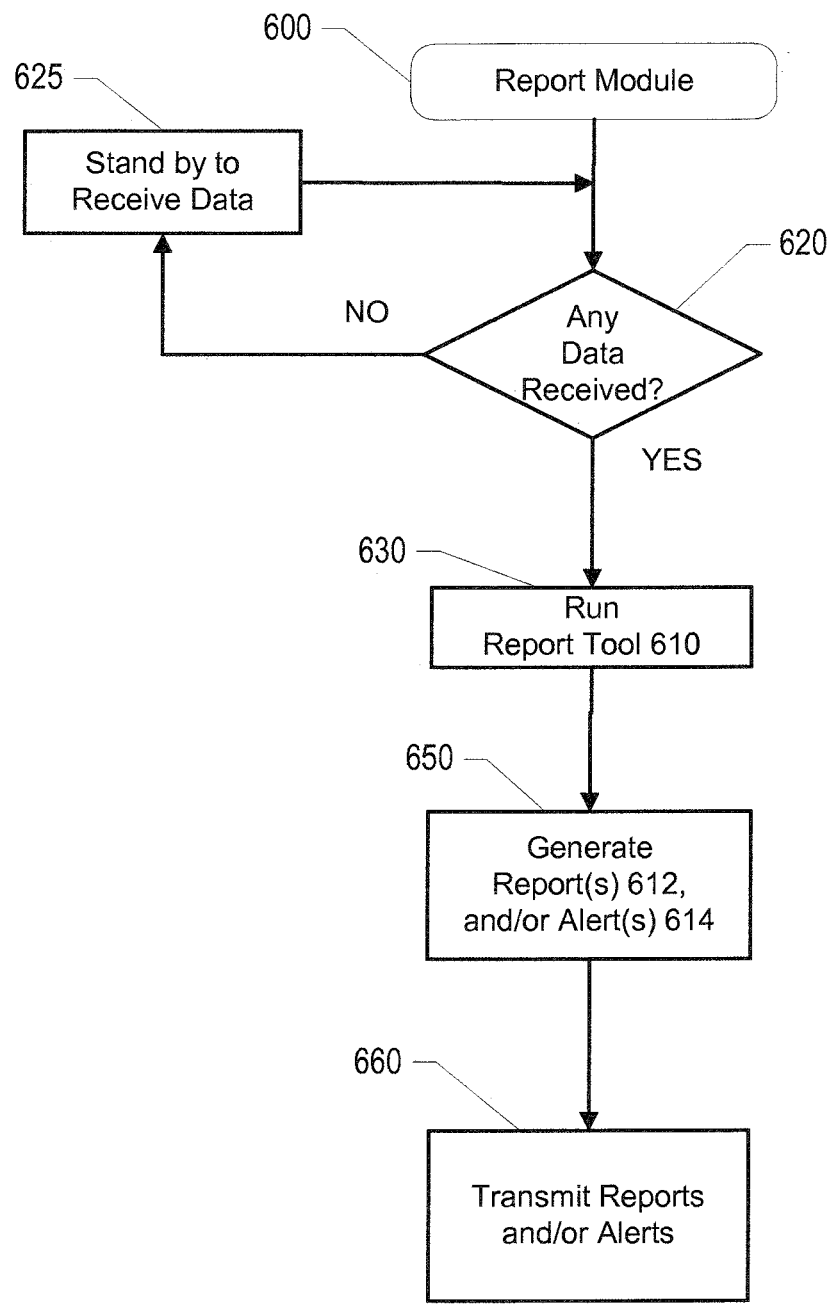
Figure 9:
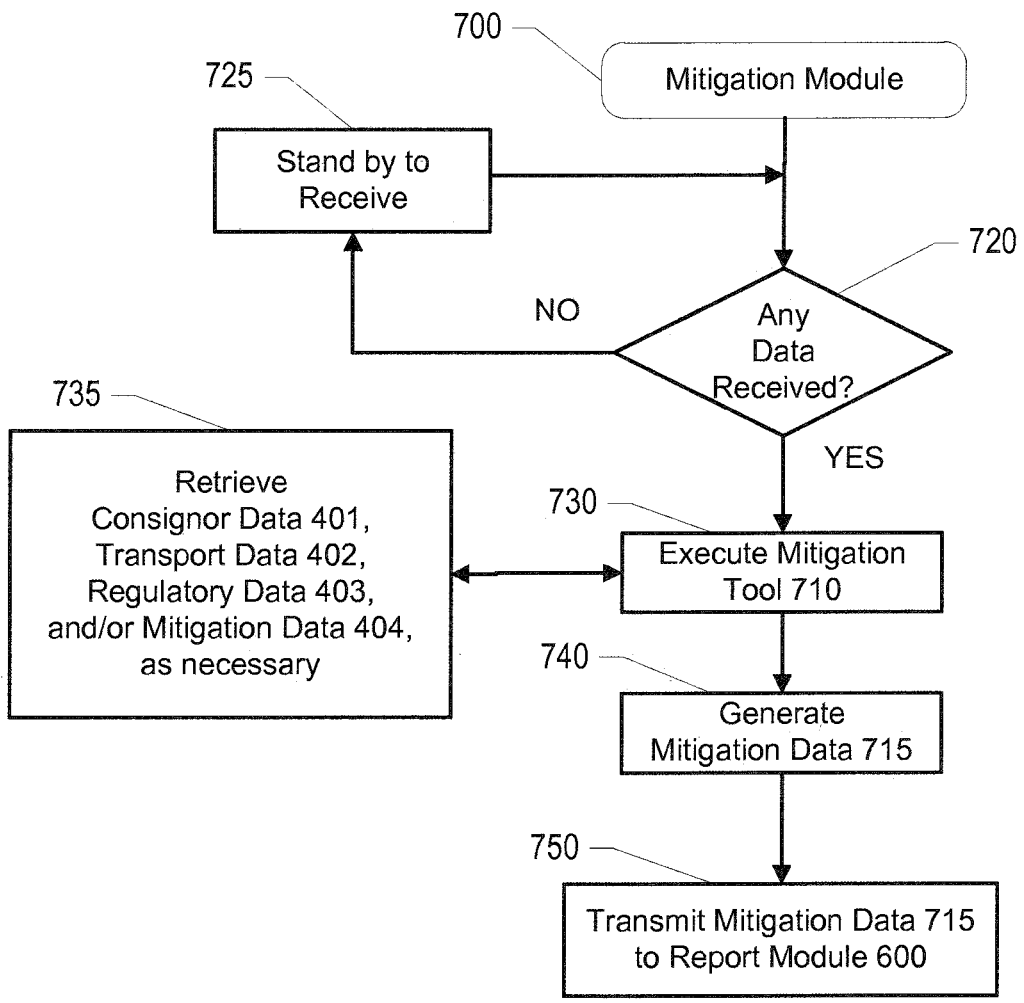
Figure 10:
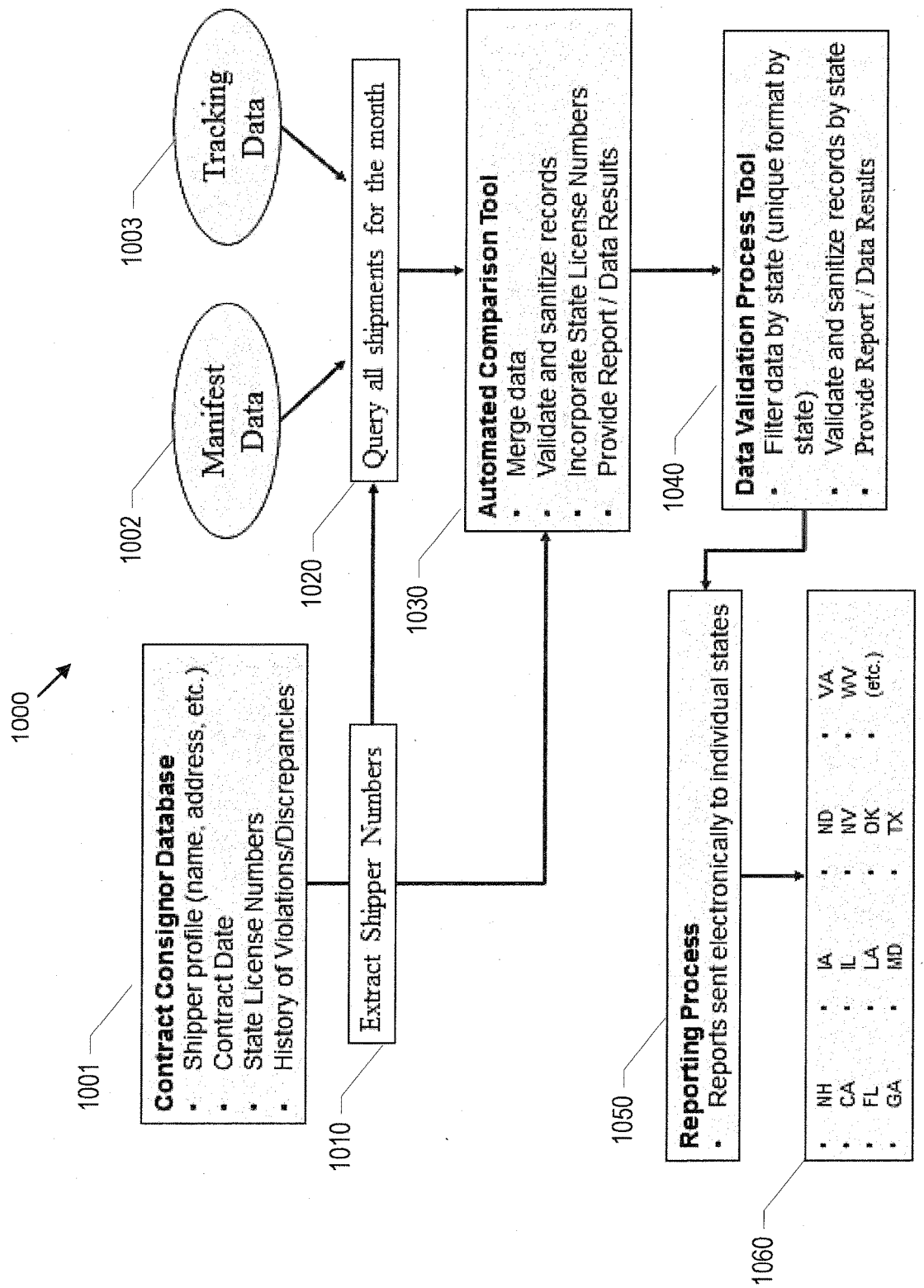

FIG. 5 is a schematic block diagram of a data module 400, an analysis module 500, a report module 600, and a mitigation module 700, all as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the analysis module 500 shown in FIGS. 2 and 5;

FIG. 8 illustrates an exemplary process flow according to various embodiments for the report module 600 shown in FIGS. 2 and 5;

FIG. 9 illustrates an exemplary process flow according to various embodiments for the mitigation module 700 shown in FIGS. 2 and 5; and FIG. 10 illustrates an exemplary process flow for the system 20 according to various embodiments of FIGS. 1-9.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to provide tools within systems, methods, and computer program products for dynamically monitoring transport of a plurality of packages potentially containing regulated goods so as to ensure compliance with one or more regulations within a plurality of jurisdictions through and/or in which transit occurs. As a non-limiting example, the tools may be configured so as to ensure that wine shipments traveling to states imposing restrictions thereupon, for transit and reporting thereof, are handled appropriately. Comparison tools may be provided to determine whether packages contain regulated goods and then if regulated goods are identified (e.g., based upon content descriptions or otherwise), the handling of the transport of the package may be validated, whether proactively prior to shipment, during shipment, or upon delivery thereof so as to ensure an intended compliance resulted in an actual compliant process. Validation may be based upon a comparison of consignor or shipper identification numbers (e.g., license numbers) against authorized license numbers for one or more jurisdictions through and/or in which transit and/or delivery of the packaged items may occur. Validation may also comprise comparison of the transit handling instructions (e.g., signature upon delivery) against required handling instructions, as may be based upon regulations for the jurisdiction of transit, or otherwise. Violations, discrepancies, and/or potential infractions may result in generation of one or more reports, alerts, and/or initiation of mitigating actions so as to attempt to alleviate or eliminate the violation or potential infraction.

Additional details in this regard and otherwise, will be provided elsewhere herein.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

Figure 1:
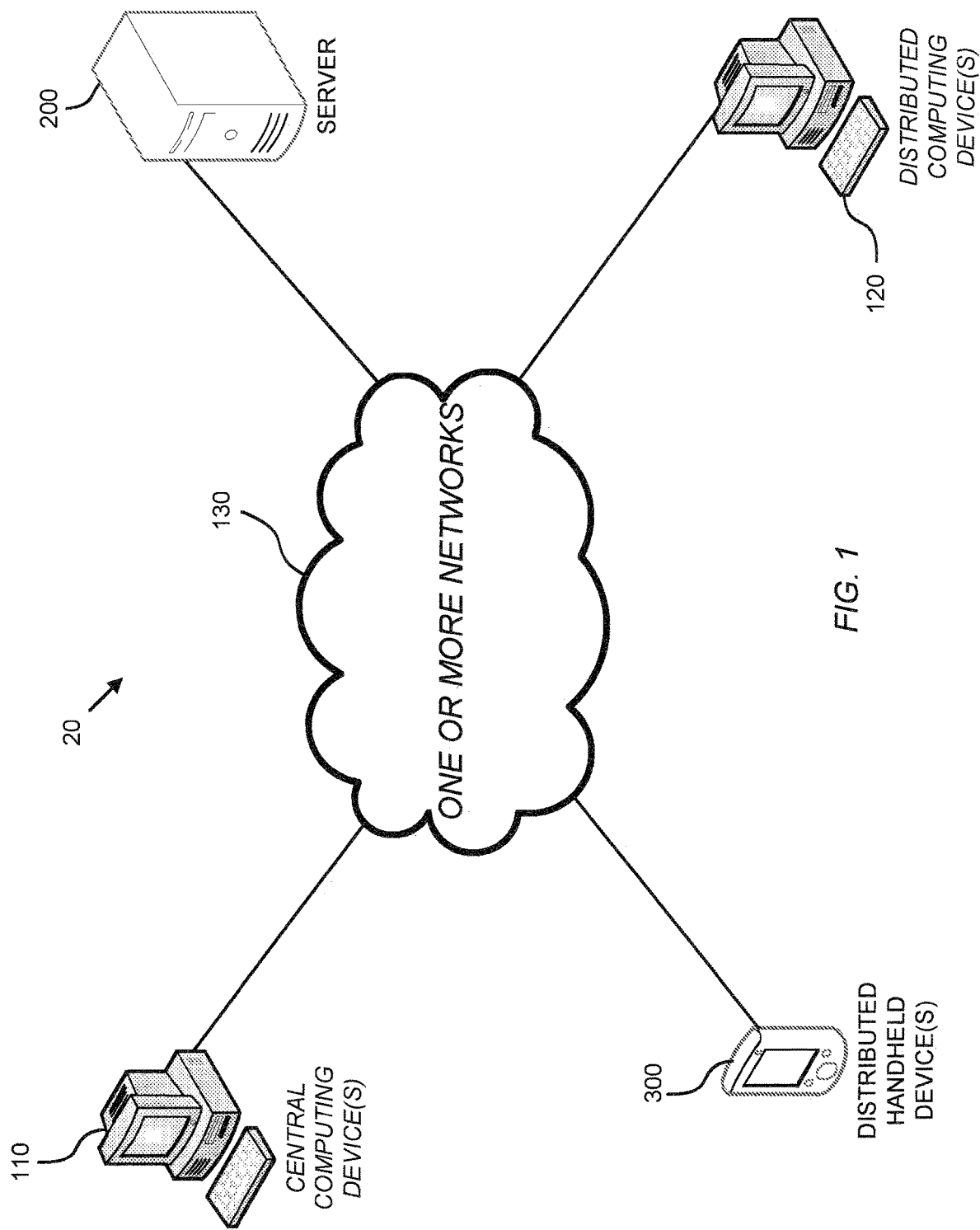
FIG. 1 is a block diagram of a system 20 according to various embodiments.

FIG. 1 is a block diagram of a system 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Exemplary Server 200

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200, all as will be likewise described in further detail below.

FIG. 2A is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, an analysis module 500, a report module 600, and a mitigation module 700. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. The operation and interaction of the program modules 400, 500, 600, 700 is described in further detail elsewhere herein.

In various embodiments, it should also be understood that one or more of the modules 400, 500, 600, 700 may be alternatively and/or additionally (e.g., in duplicate) stored locally on one or more of the devices 110, 120, and/or 300 and may be executed by one or more processors of the same. According to various embodiments, the modules 400, 500, 600, 700 may send data to, receive data from, and utilize data contained in one or more databases (see FIG. 4), which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Distributed Handheld (or Mobile) Device(s) 300

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 20 as a whole.

Server 200 Logic Flow

Reference is now made to FIGS. 3-9, which illustrate various logical process flows executed by various embodiments of the modules described previously herein. In particular, FIG. 3 illustrates the overall relationship of the modules 400, 500, 600, 700 of the server 200, according to various embodiments. As illustrated, operation of the system 20 via the server 200 begins, according to various embodiments, with the execution of the data module 400, which receives, stores, manages, and transmits a variety of data, such as the non-limiting examples of consignor data 401, transport data 402, regulatory data 403, and mitigation data 404.

At least portions of the data 401-403 is provided, as desirable, to the analysis module 500, as will be described in further detail below. The mitigation data 404 may be exchanged, both to and from, at least the mitigation module 700, as will also be described in further detail below. It should be understood, of course, that according to various embodiments, any portion of the data 401-404 may be exchanged in a one or two directional fashion between any set combinations of the modules 400-700 of the server 200, as may be desirable.

The analysis module 500 is generally configured according to various embodiments to execute one or more tools (e.g., a comparison tool 510 and a validation tool 520) to determine whether one or more packages contain at least one regulated good and to validate consignor data 401 and transport data 402. The determination may be in certain embodiments based at least in part upon a comparison of at least a portion of package content data (as may be contained within the transport data 402) with the regulatory data 403, as will be described in further detail below. The validation of the consignor data 401 may comprise in certain embodiments, at least a comparison of a consignor identification number (e.g., a shipper number or a state license number associated with a shipper or consignor) with one or more approved consignor identification numbers (e.g., approved, active, and/or valid state license numbers) in a particular jurisdiction through which transport of the package is occurring, all as will be described in further detail below. The validation of the transport data 402 may comprise in certain embodiments at least a comparison of one or more transport parameters (as may be contained within the transport data 402—for example in manifest or tracking data, or the like) with at least a portion of the regulatory data 403, all as will be described in further detail below. The comparison tool 510 may be configured in certain embodiments to generate comparison data 515 and the validation tool may be configured to generate validation data 525.

Once identified, generated data (e.g., comparison data 515 and/or validation data 525) (see FIG. 5) may be provided according to various embodiments to the report module 600, which is configured to generate one or more reports 612 or alerts 614, which may be transmitted or otherwise provided to one or more users of the system 20 or additional parties or individuals, as may be desirable. In certain embodiments, as will be described in further detail below, a report tool 610 of the report module 600 may be configured to filter and/or format received data so as to generate unique reports, as may be required or requested by certain jurisdictions. In this manner, the report module 600 may provide uniquely formatted reports based at least in part upon the jurisdiction through and in which transport of the package occurs. Reports 612 and alerts 614 may be transmitted, as may be desirable according to various embodiments, to individual jurisdictional regulatory entities, so as to enable the carrier provider of the system 20 to comply with still further jurisdictionally-based reporting and compliance regulations.

Within the mitigation module 700 according to various embodiments, a mitigation tool 710 may be configured to generate mitigation data 715 so as to identify one or more mitigation actions that may be taken to rectify an unsuccessful validation by the analysis module 500. For example, where a consignor is not authorized to ship wine into the jurisdiction of North Dakota, the mitigation action may be to intercept and reroute the package so as to avoid shipment into North Dakota. One or more mitigation actions may be carrier-defined; others, as may be desirable, may be consignor defined. The mitigation actions may also be pre-determined and/or pre-established, such that the mitigation module 700 may be configured in certain embodiments so as to automatically identify and implement mitigating action upon occurrence of an unsuccessful validation, all as will be described in further detail below.

Specifically, detailed steps performed by various embodiments of the data module 400 are described in relation to FIG. 6; steps performed by various embodiments of the analysis module 500 are described in relation to FIG. 7; steps performed by various embodiments of the report module 600 are described in relation to FIG. 8; and steps performed by various embodiments of the mitigation module 700 are described in relation to FIG. 9.

Figure 4:
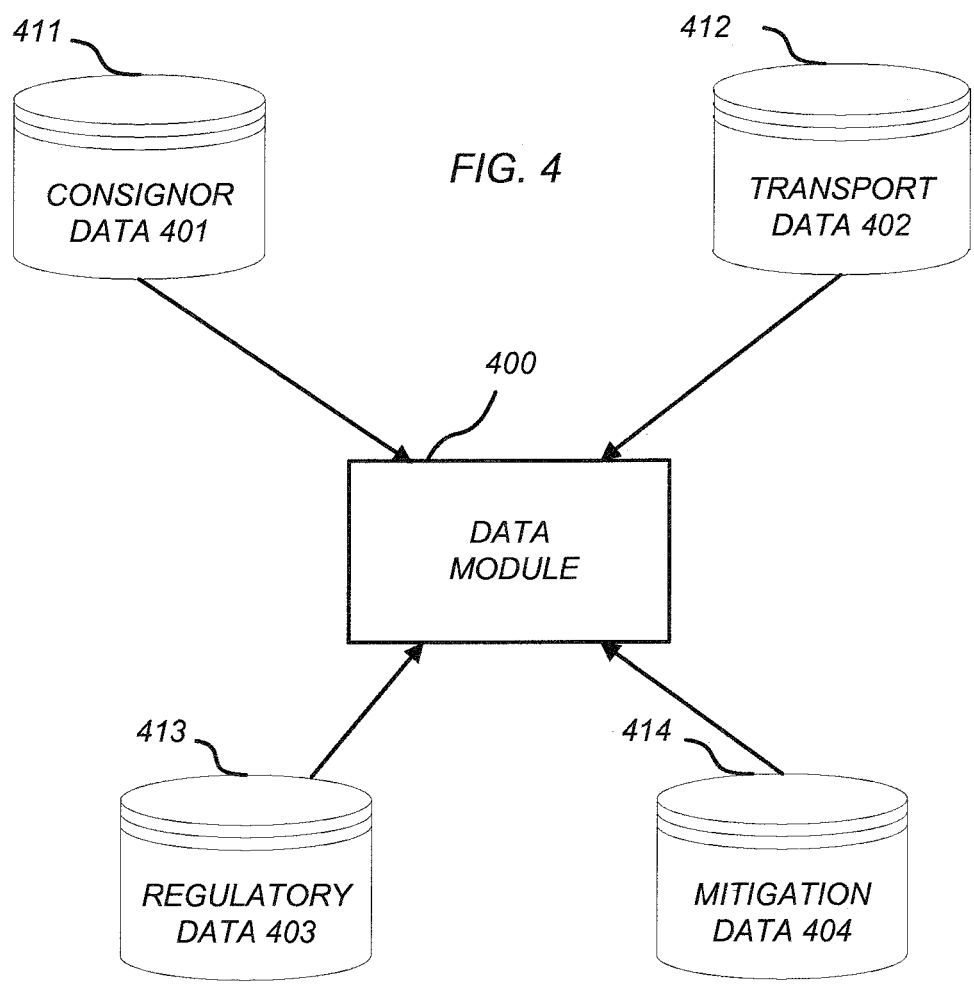
FIG. 4 illustrates a schematic diagram of various databases that are utilized by the system 20 shown in FIG. 1 according to various embodiments.

With reference now to FIG. 4, such illustrates a block diagram of various exemplary databases via which the data module 400 manages a variety of data (see also FIG. 5). In particular, in at least the embodiment shown in FIG. 4, the following databases are provided: a consignor data database 411, a transport data database 412, a regulatory data database 413, and a mitigation data database 414. Although the embodiment of FIG. 4 shows these databases 411, 412, 413, 414 as being separate databases each associated with different types of data, in various other embodiments, some or all of the data may be stored in the same database. In still other embodiments, additional and/or alternative databases may be provided, as may also be desirable for particular applications.

According to various embodiments, the consignor data database 411 may be configured to store and maintain a variety of consignor data 401. In certain embodiments, the consignor data 401 may comprise information concerning one or more shippers who use the system 20 associated with the data module 400. In at least one embodiment, the one or more shippers are consignors under contract with a carrier entity providing the system 20 and the features thereof as part of the contract terms. Non-limiting examples of consignor data 401 as may be contained within the database 411 include shipper profile data (e.g., name address, etc.), contract terms and associated data, shipper state license numbers, and/or historical violation and/or discrepancy data associated with the consignors and/or state license numbers within the database 411 (see FIG. 10). It should be understood that according to various embodiments, a variety of types and details regarding consignor data 401 may be stored within the user data database 411, however as may be desirable and/or beneficial for purposes of validating shipments requested by certain consignors against various regulations and rules, as may be applicable for those jurisdictions where transport may occur.

It should further be understood that the consignor data 401 within the database 411 may be received not only from the one or more consignors themselves (e.g., in establishing the profile data or contract data), but from a variety of sources, either external or internal to the customer, as may be appropriate given particular applications. As a non-limiting example, in certain embodiments, at least a portion of the consignor data 401 may be based at least in part upon third party obtained data, for example where the state license numbers for each particular consignor within the database 411 may be populated via state or jurisdictional-hosted databases, such that the numbers may be (as a non-limiting example) retrieved therefrom based at least in part upon basic consignor profile data (e.g., name and address, or the like).

In all of these and still other embodiments, it should be understood that, upon receipt of at least some portion of consignor data 401, the consignor data database 411 will store any newly received data in a manner associated with at least the data module 400 and for provision (whether automatically, manually, upon query therefor, whether now or at a later time) to one or more of the modules 500-700, as will also be described in further detail below. In certain embodiments, any updated or newly received consignor data 401 will overwrite previously existing data, for example, where a consignor's address may change over time. However, in other embodiments, updated data may be stored in a manner complementary of pre-existing data 401, for example, where new consignor data is received that is related to a new violation identified for a particular consignor. In such instance, according to various embodiments, the new violation related consignor data 401 will be stored so as to complement any existing historical violation and/or discrepancy data, so as to maintain a complete record thereof over time. Of course, it should also be understood that in any of these and still other embodiments, a variety of alternative configurations and/or components of consignor data 401 may exist, as may be desirable for certain applications.

According to various embodiments and with continued reference to FIG. 4, the transport data database 412 may be configured to store and maintain transport data 402 associated with various aspects of the transport of the plurality of packages for the plurality of consignors through and within any of a variety of jurisdictions (see also FIG. 10). In certain embodiments, the transport data 402 may comprise the non-limiting examples of content data associated with the package (e.g., a textual description of the contents, a barcode machine-readable image associated with the textual description of the contents, or the like), manifest data, tracking data, and/or one or more package handling parameters. It should be understood that in at least one embodiment, the manifest data may include the content data, although in other embodiments, such may be separately obtained and stored. For example, while the content data may identify descriptively the contents of the packages, the manifest data may be focused upon identifying the jurisdictions of departure, transit, and delivery, at the state, city, zip code, street, or address level, however, as may be desirable. Similarly, although the manifest data may include one or more package handling parameters, such may likewise be separately obtained and stored.

In various embodiments, the one or more package handling parameters may be one or more pre-determined transit requirements, such as a signature upon receipt, a delivery confirmation report, or the like, as may be established by the carrier and/or consignor. Notably, such parameters may be extracted from the manifest data, all within the transport data 402, as may be desirable. The tracking data according to various embodiments may be associated with the one or more package handling parameters, but in a real-time actual data fashion, as opposed to the predictive fashion involved with the manifest data. In other words, the tracking data comprises that data which is collected during the actual transit and/or delivery of the packages, for example the receipt of a signature upon delivery and the generation of a delivery confirmation report, however as may be actually implemented by the consignor's preferences and the package handling instructions for transport.

Remaining with FIG. 4, it should be understood further that the transport data 412 may be received and populated, for example, via any of a number of sources, as may be accessing and/or using the system 20. According to certain embodiments, at least some portion of the disposition data may be obtained and/or otherwise received by the system via a common carrier associated with (or providing) the system itself. In this manner, the common carrier may provide updated data such as non-limiting examples of delivery initiation, rerouting scans, unsuccessful delivery attempts, delivery confirmations, and the like. The manifest data may be likewise generated by the common carrier, although various portions thereof may be determined or pre-established by the consignor, so as to be consignor-specific. In any of these and still other embodiments, it should be understood that, upon receipt, the transport data database 412 will store any such transport data 402 in a manner associated with at least the data module 400 and for provision (whether automatically, manually, upon query therefor, whether now or at a later time) to at least one of the modules 500-700, as will also be described in further detail below. In any of these and still other embodiments, a variety of alternative configurations of data content or otherwise could also exist, as may be desirable for particular applications.

According to various embodiments, the regulatory data database 413 may be configured to store and maintain a variety of regulatory data 403. Generally speaking, the regulatory data 403 may comprise the non-limiting examples of transport requirements for one or more goods that are subject to regulatory control in one or more jurisdictions. It should be understood that although the transport requirements may be jurisdictional-specific (see FIG. 10), the database 413 will according to various embodiments contain requirements for a plurality of jurisdictions, whether state, local, city, or otherwise based. In certain embodiments, the transport requirements are at least one of (and many times both) content based and transit based. For example, regulations may generally define what contents of items of goods are subject to regulation, such that wine bottles containing wine may be regulated whereas wine glasses or used and empty wine bottles are not. As another non-limiting example, liquor bottles may be subject to regulation, whereas devices to store liquor (or wine for that matter) are not subject to regulation. Notably, the regulatory requirements may differ depending upon specific jurisdictions and the regulatory data database 413 is configured according to various embodiments to identify and manage such distinctions.

In certain embodiments, the transport requirements within the regulatory data 403 may be transit based, such as for example the state of North Dakota may mandate that all deliveries of wine within its borders must be accepted for delivery with a recipient signature, followed by generation and reporting of a delivery confirmation report. In this instance, the regulatory data 403 will, according to various embodiments, contain an indication of such requirements, as will be useful for comparisons and validations performed via the analysis module 500, as described in further detail below. In any of these and still other embodiments, it should be understood that, upon receipt, the regulatory data database 413 will store any such regulatory data 403 in a manner associated with at least the data module 400 and for provision (whether automatically, manually, upon query therefor, whether now or at a later time) to at least one of the modules 500-700, as will also be described in further detail below. It should also be understood that any updated regulatory data 403 may be configured to either complement or overwrite previously existing regulatory data, as requirements may be added, removed, or modified over time by one or more regulatory entities within one or more jurisdictions. That being said, in any of these and still other embodiments, it should further be understood that a variety of alternative configurations could also exist, however as may be desirable for various applications.

Returning to FIG. 4, according to various embodiments, the mitigation data database 414 may be configured to store and maintain a variety of mitigation data 404. Generally speaking, the mitigation data 404 may include data associated with one or more mitigating actions, as may be facilitated or implemented by the system 20 upon determination of an unsuccessful validation (in other words, upon determining that an unauthorized shipment of regulated goods is about to occur). In certain embodiments the mitigation data 404 may also include one or more pre-determined mitigation actions, as may be pre-established by one or more of the consignor or the carrier. In this manner, it should be understood that the mitigation module 700 may be configured to automatically (or manually, or upon alert and approval from a user of the system) initiate a mitigating action upon detection of a potential violation or discrepancy that could result in an unauthorized transport of a package. In any of these and still other embodiments, it should be understood that, upon receipt, the mitigation database 414 will store any such mitigation data 404 in a manner associated with at least the data module 400 and for provision (whether automatically, manually, upon query therefor, whether now or at a later time) to at least one of the modules 500-700, as will also be described in further detail below. Of course, in any of these and still other embodiments, a variety of alternative configurations could exist, as may be desirable for particular applications.

Although not specifically illustrated in FIG. 4, it should be understood from FIG. 5 that according to various embodiments, the report tool 610 is configured to generate one or more reports 612 and/or alerts 614, the content of which may be further stored within one or more of the previously detailed databases 411-414. In certain embodiments, however, an additional database may be provided for distinct storage, maintenance, and provision of report data, as may comprise at least any current and/or historical reports and/or alerts 612-614. Still further, in any of these and still other embodiments, it should be understood that, upon receipt, the report database will store any such report associated data in a manner associated with at least the data module 400 and for provision (whether automatically, manually, upon query therefor, whether now or at a later time) to at least one of the modules 500-700, as will also be described in further detail below. Of course, in any of these and still other embodiments, a variety of alternative configurations could exist, as may be desirable for particular applications.

According to various embodiments, any of the previously described databases may be configured to store and maintain not only textually based data, but also graphically based data, as may be generated by the system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, network maps (e.g., as may be particular useful in the context of simulation and intelligent visibility), and the like, all as should be generally known and understood in the art, and all as will be described in further detail in the particular context of the report module 600. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored in any of the various databases within the system 20, as may be desirable for various applications, to the extent such have not been previously described and/or allocated herein.

Summary of Exemplary System Operation

As indicated above, various embodiments of the service cycle management server 200 execute various modules (e.g., modules 400, 500, 600, 700) to dynamically monitor transport of a plurality of packages potentially containing regulated goods so as to ensure compliance with one or more regulations within one or more of a plurality of jurisdictions is provided. Such provides users of the system 20 with improved visibility of potential and/or existing violations and/or discrepancies, so as to facilitate an improved effectiveness and efficiency of avoiding such violations and/or discrepancies. In this manner, various embodiments of the system 20 and the associated server 200 and modules enables consignors and carriers (who may provide the system 20) to avoid incurring fines and perhaps worse consequences for continued and/or new violations involving shipment of restricted and/or regulated goods without proper authorization and/or without adhering to any and all necessary regulatory requirements.

Reference is now made initially to FIG. 10, which illustrates an exemplary process flow 1000 executed by the system 20 and server 200 described herein. As may be understood, according to various embodiments, the process flow 1000 begins with compilation of at least three primary data sources, namely consignor data (see step 1001), manifest data (see step 1002), and tracking data (see step 1003).

The consignor data, which may be contained within a contract consignor database (see step 1001) and include at least those consignors having a contract with a carrier providing the system and server, may include various types of consignor-related data, including the non-limiting examples of shipper profile data (e.g., name, address, etc.), contract date and associated data, state or jurisdictional license data and/or numbers for each consignor, and data associated with a history of violations and/or discrepancies attributed to the consignor's within the database. The manifest data (see step 1002) may, as a non-limiting example include destination state, city, and/or zip code data, along with various data associated with the one or more packages being transported, including the non-limiting examples of weight, dimensions, content, number of items, value of items, and the like. The manifest data may also include predicted transport data, including a planned route or duration of transit, an intended destination, and required confirmation or signature or special handling instructions. The tracking data (see step 1003) may, as a non-limiting example include any of a variety of real-time or actual transport data, as may be periodically scanned by a carrier of the packages during the transit thereof. Such may include arrival scans, reroute scans, signature confirmation scans, delivery confirmation scans, and the like, all as non-limiting examples. In this regard, further details as to the scope and content of the consignor data, along with the manifest data and the tracking data (see steps 1002 and 1003) will be described in further detail with reference to FIG. 4.

Returning again to FIG. 10, it may be understood from step 1010 and step 1020 thereof that according to various embodiments, at least the consignor identification numbers (e.g., state license numbers, etc.) may be extracted from the consignor database alongside manifest and/or tracking data over a discrete period of time. As indicated in FIG. 10, the server 200 may be configured to query all shipments for the past month in certain embodiments, although in other embodiments (as will be described in detail elsewhere herein), the periodicity may be otherwise. In still other embodiments, the data retrieval and/or query may be near real-time or real-time, such that the system and server 200 may, in at least one embodiment, passively await receipt of manifest and/or tracking data and/or any sort of consignee data or transport data (see also FIG. 4) and upon receipt thereof further execute various steps, as may be performed by at least the analysis and report modules, also described in further detail elsewhere herein.

Remaining with FIG. 10, it may be understood in step 1030 that the extracted and/or queried and/or otherwise obtained and/or received data is further processed by the server 200 via an automated comparison tool (see also FIG. 5). A data merge may be performed, such that at least the extracted shipper numbers are associated with shipments containing the same numbers therein. A validation and sanitization of the records may also occur, as will be described in further detail in the context of the analysis module 500 (see also FIGS. 5 and 7). State license numbers may be incorporated from an external database according to certain embodiments, if not otherwise provided or contained within the consignor database, in which step, jurisdictional regulatory data may also be queried, polled, and/or retrieved, so as to further validate and/or sanitize the merged data against such third-party obtained data. In this manner, the server 200 is configured to provide an objective validation process, as will be described in further detail below.

As may be seen from step 1040 of FIG. 10, according to various embodiments, upon determination by the server 200 of presence of at least one regulated good within one or more packages, the process 1000 continues with a data validation tool (see also FIG. 5). In this step, as will be described in further detail below, compliance with consignor requirements (e.g., an authorized, approved, and valid consignor shipping number for the jurisdiction in which transport occurs) and/or transport requirements (e.g., signature and/or delivery confirmation requirements). Data may be filed by state or jurisdiction, depending at least in part upon the jurisdiction(s) in or through which transit occurs. In this manner, the server 200 is configured to not only efficiently and effectively identify and process only the most pertinent data, but such data may be also further formatted appropriately (e.g., for later reports or otherwise), as may be desirable and/or necessary in accordance with requirements imposed by users of the system, whether consignors, carriers, or third party regulatory entities. Upon validation, whether successful or not, the process 1000 is configured to proceed to step 1050 wherein one or more reports may be generated and/or transmitted, electronically or otherwise, to one or more users of the system, including in certain embodiments one or more entities associated with individual states (e.g. jurisdictions). In at least one embodiment, multiple jurisdictions may be identified for reporting, as may be appropriate depending upon transit routes of the packages being examined, as may be seen in step 1060 of FIG. 10. Further details in this regard will be described more extensively below, with reference to the detailed process flow charts of at least FIGS. 6-9.

Turning now though with reference to FIG. 5, according to the embodiment shown therein as incorporating the various modules described elsewhere herein, the server 200 begins with the execution of the data module 400, which is configured to receive, store, manage, and transmit a variety of consignor data 401, transport data 402, regulatory data 403, and/or mitigation data 404, the details of which have been described previously herein. In certain embodiments, at least a portion of the data is provided to the analysis module 500 for further processing, either automatically upon, for example, receipt of at least a portion of at least transport data 402. In at least the illustrated embodiment of FIG. 5, regulatory data 403 and/or consignor data 401 may be additionally and/or alternatively provided to the analysis module 500 upon receipt thereof or otherwise. Still further, the regulatory data 403 may be provided to the report module 600, for example, so as to ensure compliance with one or more regulatory reporting guidelines. The mitigation data 404 may be likewise transmitted to and/or received from the mitigation module 700. It should be understood however that various alternatives may exist within the configured processes of the data module 400, all as will be described in further detail below.

In various embodiments, remaining with FIG. 5 and its illustration of the overall interactive nature of the various modules, the analysis module 500 is configured to receive various pieces of the data, for example at least some portion of consignor data 401, transport data 402, and/or regulatory data 403, whether collectively or individually. Upon receipt of at least one type of data 401-403, according to various embodiments, the analysis module 500 is configured to at least execute one or more tools to determine whether one or more packages contain at least one regulated good and to validate consignor data 401 and transport data 402. In at least the illustrated embodiment, such tools comprise a comparison tool 510 and a validation tool 520, although additional and/or alternative tools may be provided. The tools 510, 520 are configured to generate comparison data 515 and validation data 525, respectively, the details of which are described, in turn and in further detail, elsewhere herein.

As a non-limiting example, as will be referred to throughout herein, the received data may comprise content data and manifest data within (and/or characterized more generally as) the transport data 402 for a particular package. Such content data may comprise as a non-limiting example, a textual description of the contents of the package. Such manifest data may comprise at least an identification of a jurisdiction through which transit for a particular package is planned, along with at least some portion of identifying data associated with the shipper or consignor requesting the shipment. Based at least upon the content data, the analysis module may further retrieve some portion of regulatory data 403 so as to determine via the comparison tool 510 whether, based at least upon the identity of the contents of the package, a regulated good is contained therein. For example, upon identifying wine bottles and a jurisdiction of North Dakota, the comparison tool 510 may determine that under regulations imposed in and by North Dakota, such is a regulated good. Determinations are documented as comparison data 515, which may be further transmitted to at least the validation tool 520 and/or the report tool 610, as will be further detailed elsewhere herein.

If presence of a regulated good, such as wine is identified, the validation tool 520 of the analysis module 500 is configured according to various embodiments to receive at least the comparison data 515 and based thereon, together with further retrieved transport data 402 and consignor data 401, validate the requested shipment. For example, where a wine shipment to North Dakota may be involved, the validation tool 520 is configured according to certain embodiments to compare the consignor or shipper's identification number with approved authorized and/or valid state license numbers to determine whether the consignor or shipper is authorized to transport wine into North Dakota. The validation tool 520 may be further and/or alternatively configured according to these and still other embodiments to compare one or more transport parameters (e.g., handling requirements, signature requirements, delivery confirmation, and the like) against regulatory requirements in North Dakota for such same parameters. If discrepancies or violations are identified, validation is considered unsuccessful, which may trigger execution of the report module 600 and/or the mitigation module 700, as described elsewhere herein. In the instance of the wine shipment into North Dakota, if signature is required upon delivery, then the validation tool will verify that such is either planned (in manifest data) or has occurred (in tracking data), depending upon the timing of execution of the tool, as may be varied according to certain embodiments, as desirable.

In various embodiments, the report module 600 is configured to, upon receipt of comparison data 515 and/or validation data 525, activate a report tool 610, which is configured to generate one or more reports 612 and/or alerts 614. Alerts may be textual, audial, visual, or otherwise, all as are commonly known and understood in the art. Reports may be graphical, textual, and/or otherwise, also as may be commonly known and understood in the art. Notably, the reports 612 generated by the tool 610 may be specially configured in view of regulatory data 403, which may comprise at least one or more formatting and/or frequency parameters imposed by one or more jurisdictions, with which generated reports must comply (see also FIG. 10). In these and other embodiments, it should further be understood that the report tool 610 may be configured to not only generate, but to also transmit and/or display the reports 612 and/or alerts 614 to one or more users of the system, whether automatically, periodically, as desired according to pre-determined user parameters, or otherwise. The report module 600 may be configured to automatically take further action, as necessary (for example contacting the mitigation module 700) in certain embodiments, while in other embodiments, the module 600 may passively await further instructions in response to the transmitted reports and/or alerts, as may be desirable. In any of these and still other embodiments, it should be understood that any report or alert transmittals may be via the one or more networks 130, as previously described herein, and such displays may be via one or more interfaces, whether a web-based portal or otherwise, as may be accessible via the one or more distributed computing devices 100 and/or distributed handheld devices 110, as also described previously herein. Of course, any of a variety of reporting and notification configurations may be envisioned, all as may be desirable for particular applications.

Returning to and as may be seen from FIG. 5, the mitigation module 700 is configured to, upon receipt of various components of data, such as non-limiting examples of mitigation data 404, regulatory data 403, and/or validation data 525, or otherwise, execute a mitigation tool 710. The mitigation tool 710 is configured to generate mitigation data 715 so as to identify one or more mitigation actions that may be taken to rectify an unsuccessful validation by the analysis module 500. For example, where a consignor is not authorized to ship wine into the jurisdiction of North Dakota, the mitigation action may be to intercept and reroute the package so as to avoid shipment into North Dakota. One or more mitigation actions may be carrier-defined; others, as may be desirable, may be consignor defined. The mitigation actions may also be pre-determined and/or pre-established, such that the mitigation module 700 may be configured in certain embodiments so as to automatically identify and implement mitigating action upon occurrence of an unsuccessful validation, all as will be described in further detail below.

It should, of course, be understood that the system 20 according to certain embodiments may not include a mitigation module 700, as may be desirable for particular applications and such should be considered within the scope of inventive concepts described herein and as not departing from the nature thereof.

Data Module 400

According to various embodiments, as previously mentioned herein, the data module 400 is configured to receive, store, manage, and transmit a variety of consignor data 401, transport data 402, regulatory data 403, and mitigation data 404. Receipt may be from any of a variety of entities (e.g., a consignor, a common carrier service provider, a regulatory entity, a neutral third party, a recipient of a package shipment, or otherwise) and transmission may be to one or more of the modules 500-700, as will be described in further detail below.

FIG. 6 illustrates steps that may be executed by the data module 400 according to various embodiments. Beginning with step 420, the data module 400 assesses whether any data (e.g., consignor data 401, transport data 402, regulatory data 403, and/or mitigation data 404, all as illustrated in FIG. 5) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the system 20 via an interface, whether web-based or otherwise) and upon receipt thereof, execute step 430.

As an initial non-limiting example, which has been referred to previously herein, the newly received data may comprise may comprise content data and manifest data within (and/or characterized more generally as) the transport data 402 for a particular package. Such content data may comprise as a non-limiting example, a textual description of the contents of the package. Such manifest data may comprise at least an identification of a jurisdiction through which transit for a particular package is planned, along with at least some portion of identifying data associated with the shipper or consignor requesting the shipment. The received data may alternatively and/or additionally comprise any of the following further non-limiting examples: updated regulatory data for a particular jurisdiction, updated consignor profile data, updated tracking data reflected of actual versus projected transit handling of the package, and/or updated consignor (or common carrier) established mitigation parameters, as may be pre-established for automatic execution of the mitigation tool 710, as will be described elsewhere herein. It should be understood that in at least one embodiment, the received mitigation data 404 may comprise data indicative of execution of a mitigation action, upon completion thereof or upon approval for execution thereof, as may be understood from FIG. 5.

As previously mentioned, with reference again to FIG. 6, in any of these and still other various embodiments, if "newly received" data (e.g., consignor data 401, transport data 402, regulatory data 403, and/or mitigation data 404) is identified, the data module 400 proceeds to step 430; otherwise the module proceeds into a static loop via step 425. During step 425, the data module 400 may be configured to passively stand by for receipt of new data. In certain embodiments, the module 400 may, in step 425, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, the data module 400 is configured to transmit at least a portion of data (e.g., consignor data 401, transport data 402, regulatory data 403, and/or mitigation data 404) to at least the analysis module 500. In certain embodiments, portions of the data may be alternatively and/or additionally transmitted to the report module 600 and/or the mitigation module 700. In these and other embodiments, such transmission to various modules may be simultaneously, while in still other embodiments, transmission may be sequential and temporally spaced, as may be desirable or necessary for particular applications. Still further, in certain embodiments, the data module 400 may be configured to automatically perform step 430, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 500-700, as may be desirable for certain applications, as compared with the provision of such data from and by the data module 400 as an initiator thereof.

Analysis Module 500

As previously described, upon receipt and/or retrieval of any portion of data (e.g., consignor data 401, transport data 402, and/or regulatory data 403), the analysis module 500 is configured to at least execute one or more tools to determine whether one or more packages contain at least one regulated good and to validate consignor data 401 and transport data 402. In at least the illustrated embodiment, such tools comprise a comparison tool 510 and a validation tool 520, although additional and/or alternative tools may be provided. The tools 510, 520 are configured to generate comparison data 515 and validation data 525, respectively. Further details in this regard are provided below.

With reference now to FIG. 7, which illustrates various steps that may be executed by the analysis module 500, according to various embodiments the module is configured to begin in step 530 by receiving at least some portion of data from the data module 400. It should be understood that in certain embodiments, the analysis module 500 may be configured to periodically and/or continuously proactively retrieve and/or check for new data, as may be transmitted from the data module 400. In other embodiments, the analysis module 500 may merely passively await receipt of data from the data module, as may be desirable for particular applications.

According to various embodiments, data received in step 530 may comprise any combination of consignor data 401, transport data 402, and/or regulatory data 403 although any of a variety of types of input data may be received, as may be applicable in certain scenarios. Such data may be entered by a user via exemplary interface screen displays (not shown), which may be accessed by one or more users and/or customers of the system 20. In any of these other embodiments, the data may be received via communication with one or more additionally remote or handheld devices (e.g., receipt of real-time tracking data as transit and delivery of a package is undertaken). Still further, in any of these and still other embodiments, upon receipt of data in step 530, the analysis module is configured to proceed to step 540, wherein a comparison tool 510 (see also FIG. 5) is executed.

Otherwise, if no data is received in step 530, the analysis module 500 proceeds to step 535, entering a static loop of sorts until new data is ultimately received and identified in step 530. During step 535, the analysis module 500 may be configured to passively stand by for receipt of new data. In certain embodiments, the module may, in step 535, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

During step 540, the analysis module 500 is configured to according to various embodiments execute a comparison tool 510 to determine whether one or more packages of interest contain at least one regulated good therein. As a non-limiting example, as has been referred to throughout herein, the received data may comprise content data and manifest data within (and/or characterized more generally as) the transport data 402 for a particular package. Such content data may comprise as a non-limiting example, a textual description of the contents of the package. Such manifest data may comprise at least an identification of a jurisdiction through which transit for a particular package is planned, along with at least some portion of identifying data associated with the shipper or consignor requesting the shipment. Based at least upon the content data, the analysis module may further retrieve some portion of regulatory data 403 so as to determine via the comparison tool 510 whether, based at least upon the identity of the contents of the package, a regulated good is contained therein. For example, upon identifying wine bottles and a jurisdiction of North Dakota, the comparison tool 510 may determine that under regulations imposed in and by North Dakota, such is a regulated good. Determinations are documented as comparison data 515, which may be further transmitted to at least the validation tool 520 and/or the report tool 610, as will be further detailed elsewhere herein.

Notably, in executing the comparison tool 510 in step 540, according to various embodiments, the analysis module 500 is configured to as necessary retrieve further transport and/or regulatory data 402-403. For example, where only consignor data is initially received in step 530 and further data is necessary to fully execute the comparison tool 510, such data will be retrieved in step 545. In any event, if the presence of a regulated good, such as wine is identified, the analysis tool 510 during execution of step 540 generates comparison data 515 indicative thereof (and/or including the same), as represented in step 550. The analysis module 500 according to various embodiments is then configured via step 560 to transmit the comparison data 515 to the validation tool 520 (see also FIG. 5).

Remaining with FIG. 7, it should be understood that upon generation of comparison data 515 in step 550, in addition or alternatively to being configured to proceed immediately to step 560, the analysis module may be configured in certain embodiments to immediately transmit comparison data 515 to the report module 600. Such may be desirable, as a non-limiting example, where an immediate report is desired or required (e.g., by regulation) any time presence of a regulated good or item is discovered, even though further analysis (e.g., via the validation tool 520) may be necessary prior to formal reporting. The handling of such comparison data 515 in such circumstances is described elsewhere herein in the context of the report module 600.

Upon execution of step 560, however, the analysis module 500 is configured according to various embodiments to proceed to step 570, wherein a validation tool 520 is executed. Specifically, the validation tool 520 of the analysis module 500 is configured according to various embodiments to receive at least the comparison data 515 and based thereon, together with further retrieved transport data 402 and consignor data 401 (see step 575, as may or may not be necessary in certain embodiments), validate the requested shipment. For example, where the non-limiting and exemplary wine shipment to North Dakota may be involved, the validation tool 520 is configured according to certain embodiments to compare the consignor or shipper's identification number with approved authorized and/or valid state license numbers to determine whether the consignor or shipper is authorized to transport wine into North Dakota.

The validation tool 520 may be further and/or alternatively configured according to these and still other embodiments to compare one or more transport parameters (e.g., handling requirements, signature requirements, delivery confirmation, and the like) against regulatory requirements in North Dakota for such same parameters. If discrepancies or violations are identified within the consignor data 401 (e.g., an unauthorized or problematic (e.g., history of violations or discrepancies) license number for the shipper) or the transport data 402 (e.g., failure to include a signature requirement upon transport where such is required by regulation for destination zip code 54237, or transport into a state that limits the number of such transports and such number has been exceeded, or otherwise), validation is considered unsuccessful. Unsuccessful validation may trigger generation of one or more reports and/or notifications to one or more users of the system 20 and/or to external third parties (e.g., regulatory entities), as may be executed by the report module 600 and as described elsewhere herein.

Notably, in this regard, it should be noted with reference again to FIG. 7 that according to various embodiments, upon completion of validation in step 570, the analysis module 500 may be configured to proceed to step 580, wherein validation data 525 is generated. Such validation data 525 may generally comprise an indication of results obtained via the validation tool 520, whether indicative of a successful or unsuccessful validation. The data 525 may further include an indication separate from the results themselves. Still further, in certain embodiments, the validation data 525 may be configured so as to ensure that an unsuccessful validation results when a discrepancy or issue is identified with either the consignor or the transport data. In those and still other embodiments, successful validation of both comparisons by the tool 520 may be necessary to facilitate continued transport of the regulated good. Although, of course, in certain embodiments, only one successfully validated parameter may be necessary.

In certain embodiments, the comparison tool 510 and the validation tool 520 may be configured such that comparisons require exact matches of data for approval or validation. In other embodiments, near matches may be all that is necessary. In still other embodiments, one or more thresholds may be pre-established, whether by a user of the system or otherwise (e.g., even by a regulatory authority), whereby validation may be deemed unsuccessful if the threshold is exceeded or otherwise broached. Discrepancies less than the threshold may, in these and still other embodiments, be nevertheless permissible, as may be desirable in certain instances.

Notably, upon generation of the validation data 525 during step 580 according to various embodiments, the analysis module 500 is configured to proceed to step 590, wherein at least a portion thereof is transmitted to the report module 600 and/or the mitigation module 700 for further processing and handling, all as will be described in further detail below.

Report Module 600

With reference to FIG. 8, according to various embodiments, the report module 600 is configured to generate one or more reports 612 and/or alerts 614 to one or more users of the system 20 (or other parties, such as third party entities operating as regulators of one or more jurisdictions), as may be desirable according to particular applications. In certain embodiments, the reports 612 and/or alerts 614 are based at least in part upon the generated comparison data 515 and/or validation data 525, as have been previously described herein, although in other embodiments still further data may be incorporated therewith (e.g., regulatory data 403 and/or mitigation data 715). It should be understood, however, that according to various embodiments the report module 600 is configured so as to facilitate users of the system 20 obtaining data from which they can assess and/or revise asset recovery-focused decisions, so as to most efficiently and effectively maximize recovery rates and/or yield values over time.

Returning to the previously described non-limiting example, where wine bottles are identified by the comparison tool 510 of the analysis module 500, according to various embodiments, such identification (as may be characterized as comparison data 515 or within the same) may be transmitted to the report module 600 for generation of one or more reports or alerts. In one scenario, if shipment of a regulated good is required, such transmission will permit the report tool 610 to compare the comparison data 515, including the content data and description of the items within the package with portions of the regulatory data 403 associated therewith. If, for example, an advance notification is required for identification of wine bottles expected to enter a particular jurisdiction (e.g., North Dakota), the report module may be configured so as to generate an appropriate report (and/or alert) and further transmit the same to the one or more appropriate parties and/or users of the system 20, as may be defined by user preferences or the regulatory data itself. More details regarding the specific steps within this non-limiting example are described, in turn, below, with continued reference to FIG. 8.

Specifically, beginning with step 620, the report module 600 is configured according to various embodiments to assess whether any data (e.g., comparison data 515 or validation data 525, which may be generated by the various tools of the analysis module 500, as previously described herein) has been received by the module. In certain embodiments, the report module 600 makes this assessment by periodically scanning one or more databases (see FIG. 4) associated with the data module 400 and by identifying some portion of data within one or more of the databases that was not present during a previous periodic scan under step 620. Alternative configurations may be envisioned, wherein, as a non-limiting example, the report/execution module 600 may actively receive data directly from the analysis module 500 upon the generation thereof (e.g., as illustrated in at least FIG. 5).

With focus again on FIG. 8, in any of these and still other various embodiments, if "newly received" data is identified in step 620, the report module 600 proceeds to step 630; otherwise the module proceeds into a static loop via step 625, pending receipt of new data. During step 625, the report module 600 may be configured to passively stand by for receipt of data. In certain embodiments, the report module 600 may, in step 625, periodically (e.g., every 5 seconds, or at any desirable interval) proactively ping one or more databases contained within the data module 400 and/or the analysis module 500, as may be desirable. Various alternative data monitoring configurations may be envisioned, without departing the scope and nature of the present invention, as such are commonly known and understood in the art.

During step 630, the report module 600 is configured to run a report tool 610, which is generally configured to generate, in step 650, one or more reports 612 and/or alerts 614 based at least in part upon the comparison data 515 and/or the validation data 525. For example, if an advance notification is required for identification of wine bottles expected to enter a particular jurisdiction (e.g., North Dakota), the report module may be configured so as to generate an appropriate report (and/or alert) thereof. As another non-limiting example, the generated reports and/or alerts may comprise an indication of an unsuccessful validation based upon an unauthorized consignor number, or alternatively based upon a consignor number triggering an alert based upon identification of one or more historic (e.g., existing) violations or discrepancies associated with the same. In certain embodiments, the generated reports and/or alerts may be uniquely formatted based upon jurisdiction, consignor, regulatory, or other parameters, as may be incorporated by the system 20 via the data module. Still further, in other embodiments, the alert(s) 614 may be generated concurrently with the reports 612 whereas in still other embodiments the alerts may be separately generated from the reports, resulting in temporal differences there-between. The timing and distinctions between the delivery and transmission of the reports and alerts may be based upon any of a variety of consignor preferences, regulatory requirements, and/or common carrier preferences or requirements, as may be applicable in various contexts.

It should also be understood, returning to FIG. 8, that according to various embodiments, during step 660, any combination of the reports 612 and/or alerts 614 that may have been generated, as may be influenced by previously defined parameters, whether by the customer or other users of the system 20, may be further transmitted (via one or more networks or otherwise) to one or more users or associated entities of the system. For example, upon generation of an alert 614 of a potential violation, an indication thereof may be transmitted to at least the common carrier for notification thereof so that mitigation actions and the like may be taken so as to seek to avoid actual occurrence of the violation. Various scenarios may be envisioned, further including the non-limiting examples of: notification of shipment of a regulated good into an unauthorized jurisdiction; suspension of a valid consignor identification number mid-transit of a package, and the like.

It should be understood that while the alerts 614 and reports 612 described herein may be transmitted periodically and with differing timetables respective to one another, the basis of both generating and transmitting the same may also further differ. For example, alerts may be reserved for actions for which user (or third party entity) approval is necessary for further action, for example, where approval is necessary to implement mitigation actions, whether due to the cost incurred thereby or for alternative reasons. In such embodiments, reports, both with respect to content and the frequency thereof, may be established and even pre-established by any of the variety of users of the system, including non-users of the system to which notification or reporting may be mandated by various regulations (e.g., a monthly report to the North Dakota Alcoholic Beverage Commission). The formatting of such reports and/or alerts may also be customized, as may be desired for particular users of the system. Additional and/or alternative formats of reporting and/or communication may be envisioned without departing from the scope and intent of the present invention, and any of those, like those described previously herein, may be implemented in a manual or automatic fashion, electronically or otherwise, however as may be desirable.

Mitigation Module 700

As previously described, the mitigation module 700 is configured to, upon receipt of various components of data, such as non-limiting examples of mitigation data 404, regulatory data 403, and/or validation data 525, execute a mitigation tool 710.

FIG. 9 illustrates steps that may be executed by the mitigation module 700 according to various embodiments. Beginning with step 720, the mitigation module 700 assesses whether any data has been received by the module.

In certain embodiments, the mitigation module 700 makes this assessment by periodically scanning one or more databases (see FIG. 4) associated with the module and by identifying some portion of data within one or more of the databases that was not present during a previous periodic scan under step 720. Of course, alternative configurations may be envisioned, wherein, as a non-limiting example, the mitigation module 700 may actively receive data (e.g., as input by a user of the system 20 via an interface, whether web-based or otherwise and/or directly from the analysis module 500 or the data module 400) and upon receipt thereof, execute step 730.

With continued reference to FIG. 9, in any of these and still other various embodiments, if "newly received" data is identified, the mitigation module 700 proceeds to step 730; otherwise the module proceeds into a static loop via step 725. During step 725, the mitigation module 700 may be configured to passively stand by for receipt of new data. In certain embodiments, the module may, in step 725, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

During step 730, the mitigation module 700 is configured to according to various embodiments execute a mitigation tool 710 to determine whether mitigation actions are warranted, appropriate, or even desired, and if so, to facilitate and/or initiate implementation thereof. In certain embodiments, the mitigation tool 710 may be still further configured to confirm completion of a particularly determined and initiated mitigation action. Non-limiting examples of mitigation actions include interception of the potentially violation-incurring package, rerouting of the same, modification of transit handling parameters (e.g., adding a signature requirement for delivery to a manifest, if such is mandated by regulation and thus necessary), and/or delaying further transit until rectification occurs. Any number of a variety of possible actions may be envisioned, as within the scope of mitigation potential and occurring violations, and such should all be considered within the scope of the various embodiments described herein, provided such at least in some fashion enable efforts to mitigate actual occurrence of a violation/discrepancy or mitigate further violating activity should the initial violation have already occurred.

According to various embodiments, the mitigation tool 710 may be configured to determine the appropriate mitigation action based upon retrieval (see step 735) of various portions of consignor data 401, transport data 402, regulatory data 403, and/or prior mitigation data 404, the latter of which may include, at a minimum, previously executed mitigation actions that may be presently considered. The consignor data 401 may be used, as a non-limiting example, for the tool 710 to determine whether the consignor has established any preferred mitigation actions or even any pre-approved (and thus not requiring present approval) actions. The regulatory data 403 may be cross-referenced further with the consignor data according to various embodiments, so as to ensure that the pre-established mitigation actions do not run further afoul of still other portions of the regulatory data, as may have not been previously considered by the analysis tool 500, as described elsewhere herein. The transport data 402 may be referenced and utilized by the mitigation tool 710 to further assess the feasibility of potential mitigation actions, as such may be impacted by service parameters (e.g., urgency of delivery deadline due to environmental conditions or otherwise), such that one or more of the potential mitigation actions may be deemed by the tool as unacceptable. Indeed, a variety of scenarios may be envisioned and should be considered as within the scope and content of the various embodiments described herein.

According to various embodiments, with continued reference to FIG. 9, upon determination of one or more feasible and/or optimal mitigation actions via execution of the mitigation tool 710 in step 730, the mitigation module 700 is configured to execute step 740, in which mitigation data 715 is generated. The mitigation data 715 according to various embodiments may include at least one identified mitigation action. In certain embodiments, two or more mitigation actions may be identified, as may be transmitted to the report module (see step 750) so as to permit a user of the system (e.g., the consignor or the carrier) to select a desired action, if any. In other embodiments, the identified mitigation action may be further implemented (or the implementation thereof is at least initiated by transmitting appropriate instructions for the same), such that an indication not only of identification of mitigating action but also implementation and/or completion thereof may be transmitted to the report module in step 750. In these and still other embodiments, it should be understood that identification, selection, and implementation of the mitigation action within the mitigation data 715 may be automatic, such that the mitigation data may further include instructions for (and which may be transmitted to) parties responsible for the implementation of the instructions.

With continued reference to FIG. 9, in step 750 it should be understood that, as previously alluded to, the transmission of the mitigation data 715 to the report module 600 may be such that the report module may, in turn, generate one or more reports and/or alerts to either facilitate implementation of the mitigation action or to notify one or more users of the system 20 of initiated action or of a need for approval to initiate the action, however, as may be desirable in certain applications. It should be understood as well that any of a variety of configurations, whether automatic, semi-automatic, manual requiring approval, or otherwise may be envisioned, as considered within the scope and nature of the various embodiments of the system 20 described herein.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A regulated goods reporting system for dynamically monitoring transport of a plurality of packages potentially containing regulated goods so as to ensure compliance with one or more regulations within one or more of a plurality of jurisdictions, said system comprising:

one or more memory storage areas containing consignor data associated with one or more consignors requesting transport of the plurality of packages, the consignor data comprising at least a consignor identification number; and one or more computer processors configured to:

receive transport data associated with the transport of at least one of the plurality of packages, the transport data comprising at least package content data, one or more transport parameters, and an identification of at least one jurisdiction in which transport of the one of the plurality of packages occurs;

retrieve regulatory data associated with the at least one jurisdiction in which transport occurs;

determine whether the one of the plurality of packages contains at least one regulated good;

upon determining that the one of the plurality of packages contains at least one regulated good, validate the consignor data and the transport data, the validation of the consignor data comprising a comparison of the consignor identification number against one or more approved consignor identification numbers of the at least one jurisdiction;

in response to an unsuccessful validation of the consignor data or the transport data:

execute a mitigation module to determine one or more optimal mitigation actions configured to obviate one or more discrepancies identified between at least one of the consignor data or the transport data and the regulatory data, wherein the one or more optimal mitigation actions comprises at least delaying further transit until successful validation of the consignor data or the transport data; and automatically generate and transmit instructions to at least the mobile device, the instructions being configured to automatically implement at least one of the determined one or more optimal mitigation actions.

2. The system of claim 1, wherein the one or more computer processors are further configured to:

revalidate the consignor data and the transport data to determine if the consignor data and transport data are valid.

3. The system of claim 2, wherein the one or more computer processors are further configured to:

in response to determining that the consignor data and transport data are valid, automatically generate and transmit instructions to at least the mobile device, the instructions being configured to automatically halt the implementation of the at least one of the determined one or more optimal mitigation actions.

4. The system of claim 2, wherein the one or more computer processors are further configured to:

in response to determining that the consignor data and transport data are valid, generate, via the one or more computer processors, at least one report configured to approve continued transport of the one of the plurality of packages; and periodically transmit the at least one report configured to approve continued transport to one or more users.

5. The system of claim 4, wherein the one or more computer processors are further configured to:

format the at least one report configured to approve continued transport based upon one or more requirements imposed by the at least one identified jurisdiction; and transmit the formatted report to at least one user associated with a governing entity for the at least one identified jurisdiction.

6. The system of claim 4, wherein:

the one or more transport parameters comprises at least one of a signature requirement or a confirmation requirement upon delivery of the one of the plurality of packages; and the validation of the transport data comprises validation of the one or more transport parameters based upon a comparison of the one or more transport parameters and the imposed transit-based restrictions of the regulatory data.

7. The system of claim 1, wherein the regulatory data comprises one or more jurisdictional-based requirements imposing content-based restrictions upon the transport of the one of the plurality of packages.

8. The system of claim 7, wherein:

the package content data comprises a textual description of one or more items within the one of the plurality of packages; and the determination of whether the one of the plurality of packages contains at least one regulated good is based upon a comparison of the textual description and one or more pre-established trigger terms based at least in part upon the imposed content-based restrictions of the regulatory data.

9. The system of claim 1, wherein the regulatory data comprises one or more jurisdictional-based requirements imposing transit-based restrictions upon the transport of the one of the plurality of packages.

10. The system of claim 1, wherein:

the validation of the consignor data further comprises a determination of whether the consignor identification number is associated with one or more historical violations or discrepancies; and identification of at least one association between the consignor identification number and the one or more historical violations or discrepancies results in an unsuccessful validation of the consignor data.

11. The system of claim 1, wherein the one or more computer processors are configured to receive the transport data during ongoing transit of the one of the plurality of packages.

12. The system of claim 1, wherein the regulatory data associated with the at least one jurisdiction in which transport occurs is received from a computing device associated with the at least one jurisdiction.

13. A computer-implemented method for dynamically monitoring transport of a plurality of packages potentially containing regulated goods so as to ensure compliance with one or more regulations within one or more of a plurality of jurisdictions, said method comprising the steps of:

receiving and storing within one or more memory storage areas:

consignor data associated with one or more consignors requesting transport of the plurality of packages, the consignor data comprising at least a consignor identification number;

transport data associated with the transport of at least one of the plurality of packages, the transport data comprising at least package content data, one or more transport parameters, and an identification of at least one jurisdiction in which transport of the one of the plurality of packages occurs; and regulatory data associated with a plurality of jurisdictions in which transport of the plurality of packages may occur;

determining, via at least one computer processor, whether the one of the plurality of packages contains at least one regulated good;

upon determining that the one of the plurality of packages contains at least one regulated good, validating, via the at least one computer processor, the consignor data and the transport data, the validation of the consignor data comprising a comparison of the consignor identification number against one or more approved consignor identification numbers of the at least one jurisdiction;

in response to an unsuccessful validation of the consignor data or the transport data:

executing, via the at least one computer processor, a mitigation module to determine one or more optimal mitigation actions configured to obviate one or more discrepancies identified between at least one of the consignor data or the transport data and the regulatory data, wherein the one or more optimal mitigation actions comprise at least delaying further transit until successful validation of the consignor data or the transport data; and automatically generating and transmitting, via the at least one computer processor to at least the mobile device, the instructions being configured to automatically implement at least one of the determined one or more optimal mitigation actions.

14. The system of claim 13, wherein the one or more computer processors are further configured to:

revalidate the consignor data and the transport data to determine if the consignor data and transport data are valid.

15. The system of claim 14, wherein the one or more computer processors are further configured to:

in response to determining that the consignor data and transport data are valid, automatically generate and transmit instructions to at least the mobile device, the instructions being configured to automatically halt the implementation of the at least one of the determined one or more optimal mitigation actions.

16. The system of claim 14, wherein the one or more computer processors are further configured to:

in response to determining that the consignor data and transport data are valid, generate, via the one or more computer processors, at least one report configured to approve continued transport of the one of the plurality of packages; and periodically transmit the at least one report configured to approve continued transport to one or more users.

17. The system of claim 16, wherein the one or more computer processors are further configured to:

format the at least one report configured to approve continued transport based upon one or more requirements imposed by the at least one identified jurisdiction; and transmit the formatted report to at least one user associated with a governing entity for the at least one identified jurisdiction.

18. The computer-implemented method of claim 13, further comprising the steps of:

in response to a successful validation of the consignor data and the transport data, generating, via the one or more computer processors, at least one report configured to approve continued transport of the one of the plurality of packages; and periodically transmitting the at least one report configured to approve continued transport to one or more users.

19. A non-transitory computer program product comprising at least one computer-readable storage medium having computer-readable program code portions embodied therein, the computer-readable program code portions comprising at least one executable portion configured for:

receiving a plurality of data, wherein said data comprises:

(i) consignor data associated with one or more consignors requesting transport of the plurality of packages, the consignor data comprising at least a consignor identification number;

(ii) transport data associated with the transport of at least one of the plurality of packages, the transport data comprising at least package content data, one or more transport parameters, and an identification of at least one jurisdiction in which transport of the one of the plurality of packages occurs; and (iii) regulatory data associated with a plurality of jurisdictions in which transport of the plurality of packages may occur;

determining whether the one of the plurality of packages on one or more vehicles contains at least one regulated good;

upon determining that the one of the plurality of packages contains at least one regulated good, validating the consignor data and the transport data, the validation of the consignor data comprising a comparison of the consignor identification number against one or more approved consignor identification numbers of the at least one jurisdiction;

in response to an unsuccessful validation of the consignor data or the transport data:

executing a mitigation module to determine one or more optimal mitigation actions configured to obviate one or more discrepancies identified between at least one of the consignor data or the transport data and the regulatory data, wherein the one or more optimal mitigation actions comprise at least delaying further transit until successful validation of the consignor data or the transport data; and automatically generate and transmit instructions to at least the mobile device, the instructions being configured to automatically implement at least one of the determined one or more optimal mitigation actions.

* * * * *

UNITED STATES PATENT AND TRADEMARK OFFICE
CERTIFICATE OF CORRECTION

| | | |
|---|---|---|
| PATENT NO. | : 11,488,092 B2 | |
| APPLICATION NO. | : 17/091884 | |
| DATED | : November 1, 2022 | |
| INVENTOR(S) | : Dave Gittings et al. | |

It is certified that error appears in the above-identified patent and that said Letters Patent is hereby corrected as shown below:

In the Specification

Column 8, Line 39:
In the line reading "readable media provide nonvolatile storage for a personal" should read -- readable media provide non-volatile storage for a personal --.

Column 21, Lines 15-16:
In the line reading "referred to previously herein, the newly received data may comprise may comprise content data and manifest data" should read -- referred to previously herein, the newly received data may comprise content data and manifest data --.

In the Claims

Claim 14, Column 31, Line 20:
In the line reading "the system of claim 13, wherein the one or more" should read -- the method of claim 13, wherein the one or more --.

Claim 15, Column 31, Line 25:
In the line reading "the system of claim 14, wherein the one or more" should read -- the method of claim 14, wherein the one or more --.

Claim 16, Column 31, Line 33:
In the line reading "the system of claim 14, wherein the one or more" should read -- the method of claim 14, wherein the one or more --.

Claim 17, Column 31, Line 42:
In the line reading "the system of claim 16, wherein the one or more" should read -- the method of claim 16, wherein the one or more --.

Signed and Sealed this
Seventh Day of February, 2023

Katherine Kelly Vidal
*Director of the United States Patent and Trademark Office*